(12) United States Patent
Volk et al.

(10) Patent No.: US 10,620,424 B1
(45) Date of Patent: Apr. 14, 2020

(54) LENS FOR USE WITH IMAGING SENSORS

(71) Applicant: Precision Optics Corporation, Inc., Gardner, MA (US)

(72) Inventors: Brian E. Volk, Jefferson, MA (US); Joseph N. Forkey, Princeton, MA (US)

(73) Assignee: Precision Optics Corporation, Inc., Gardner, MA (US)

( * ) Notice: Subject to any disclaimer, the term of this patent is extended or adjusted under 35 U.S.C. 154(b) by 0 days.

(21) Appl. No.: 15/706,116

(22) Filed: Sep. 15, 2017

Related U.S. Application Data

(60) Provisional application No. 62/395,569, filed on Sep. 16, 2016.

(51) Int. Cl.
*G02B 23/24* (2006.01)

(52) U.S. Cl.
CPC ........ *G02B 23/243* (2013.01); *G02B 23/2484* (2013.01)

(58) Field of Classification Search
CPC .............. G02B 23/243; G02B 23/2484; G02B 23/2469; G02B 23/26; G02B 23/2476; G02B 13/04; G02B 23/24; G02B 23/2415; G02B 23/2446; G02B 13/18; G02B 23/2461; G02B 27/0025; G02B 23/2423; G02B 23/2492; G02B 9/12; G02B 13/0095; A61B 1/00096; A61B 1/04; A61B 1/00188; A61B 1/00009; A61B 1/00163; A61B 1/0011; A61B 1/051; A61B 1/05; A61B 1/00; A61B 1/0676; A61B 1/0684; A61B 1/00114; A61B 1/0607; A61B 1/07; A61B 1/045; A61B 1/00006; A61B 1/06
See application file for complete search history.

(56) References Cited

U.S. PATENT DOCUMENTS

| | | | | |
|---|---|---|---|---|
| 6,134,056 A | * | 10/2000 | Nakamuka | G02B 9/04 359/660 |
| 2015/0103407 A1 | * | 4/2015 | Chen | G02B 1/11 359/601 |
| 2017/0135563 A1 | * | 5/2017 | Uemori | A61B 1/00009 |
| 2017/0235121 A1 | * | 8/2017 | Igarashi | G02B 13/04 359/753 |
| 2017/0307872 A1 | * | 10/2017 | Hatase | A61B 1/00009 |
| 2017/0343790 A1 | * | 11/2017 | Ushio | A61B 1/00163 |
| 2018/0231763 A1 | * | 8/2018 | Ozao | A61B 1/05 |

OTHER PUBLICATIONS

JPO 2016-087487 Original and English machine translation.*
Smith, Warren J. *Modern Optical Engineering, The Design of Optical Systems*, Second Edition, MacGraw Hill, Inc., (1990), pp. 23-24.
Wolfe, William L., *Optical Engineer's Desk Reference*, Optical Society of America, (2003), p. 288.

* cited by examiner

Primary Examiner — William R Alexander
Assistant Examiner — Sharrief I Broome
(74) Attorney, Agent, or Firm — Cesari and McKenna, LLP

(57) ABSTRACT

An objective element for use in an endoscope is provided. The objective element comprises a flat glass plate that is in contact with the plano side of a plano-convex lens. The side of the flat glass plate in contact with the plano-convex lens is coated with an opaque material other than an aperture that is in line with the axis of the plano-convex lens. Alternatively, the plano side of a plano-convex lens may be coated with an opaque material other than an aperture that is in line with the axis of the plano-convex lens.

16 Claims, 6 Drawing Sheets

LENS FOR USE WITH IMAGING SENSORS

PRIORITY

The present application claims priority to U.S. Provisional Patent Application Ser. No. 62/395,569, entitled ENDOSCOPE LENS FOR USE WITH CMOS IMAGING SENSORS, and filed Sep. 16, 2016, the contents of which are hereby incorporated by reference.

BACKGROUND

Technical Field

The present invention relates to lens and, more particularly to lenses for use with imaging sensors.

BACKGROUND INFORMATION

Minimally invasive surgery has been made possible by endoscopes with high quality imaging capabilities. These endoscopes are typically 1.9 to 10 mm in diameter and can be either rigid or flexible. The image quality is determined by a number of factors including the image quality generated by the optical objective at the distal end of the endoscope.

Most endoscopes are re-sterilized after each procedure and then re-used. While re-sterilization techniques are highly effective, they are not 100% effective. In some cases, when the sterilization procedure does not fully sterilize the endoscope, a potential exists for a future patient to be infected by biological agents transferred via the contaminated endoscope from an earlier, infected, patient. In order to reduce the risk of such cross-contamination, there is a desire to develop single-use endoscopes, which would be sterilized once before use and then discarded.

A single-use endoscope will require a low total cost. In particular, the cost of the imaging system must be low. By using CMOS image sensors, many relay lenses in a rigid endoscope and coherent fiber image bundles in flexible endoscopes can be eliminated, thereby reducing cost. However, a CMOS image sensor still requires a low cost objective to form an image of the inside of the body onto the active area of the CMOS sensor.

What is needed is a low cost design for an objective that can be used to generate high quality images on a CMOS sensor.

SUMMARY

The disadvantages of the prior art are overcome by the objective element described herein. In accordance with an illustrative embodiment of the present invention, an objective element located at a distal end of an endoscope (or other device) provides an image onto an image sensor, which may be a CMOS image sensor. The objective element illustratively comprises a flat element and a plano-convex lens element. The flat element is coated on an inner side with an opaque material except for a substantially circular aperture that is in axial alignment with the apex of the curved surface of the plano-convex lens. In operation, the blur spot size caused by the field curvature is smaller than the effective pixel size of the image sensor.

In accordance with another illustrative embodiment of the present invention, the objective is a single plano-convex lens element. The plano side of the element is coated with an opaque material except for a substantially circular aperture that is in axial alignment with the apex of the curved surface of the plano-convex lens. This alternative embodiment eliminates the need for the flat element as part of the objective element.

BRIEF DESCRIPTION OF THE DRAWINGS

The above and further advantages of the present invention are described in connection with the accompanying figures in which like reference numerals indicate identical or functionally similar elements, of which.

DETAILED DESCRIPTION OF AN ILLUSTRATIVE EMBODIMENT

Figure 1A:
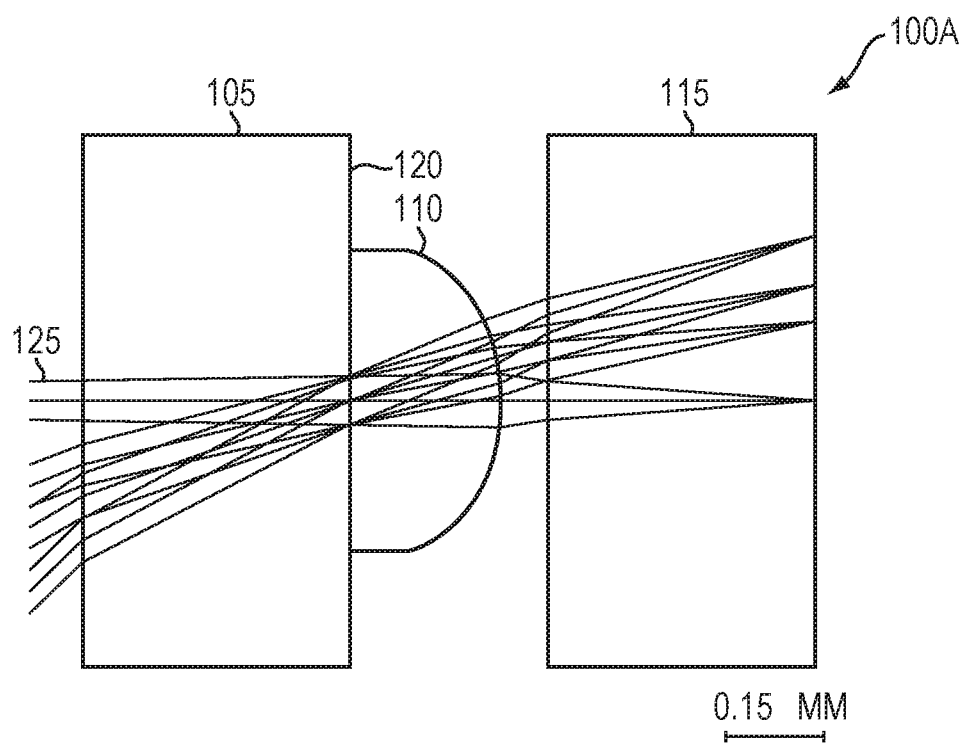
FIG. 1A is a view illustrating an exemplary lens assembly in accordance with an illustrative embodiment of the present invention.

This invention describes a very low cost objective lens for use with properly specified CMOS image sensors in an endoscope. Endoscopes are well known in the art. Exemplary endoscopes are described in U.S. Pat. No. 6,139,490, entitled Stereoscopic Endoscope with Virtual Reality Viewing, U.S. Pat. No. 5,980,453, entitled Endoscope with Low Distortion, U.S. Pat. No. 7,758,498, entitled Endoscope with Relief of Axial Loading, and U.S. Patent Publication No. 2012/0212813 entitled Maximizing Illumination Fiber in an Endoscope, the contents of each of which are hereby incorporated by reference. Endoscopes are generally described in relation to FIGS. 4 and 5, described further below. The design of the illustrative objective lens is shown in FIGS. 1A and 1s comprised of a flat element 105 in contact with the plano side of a plano convex lens 110. The flat element 105 may be constructed of any suitable transparent material, such as optical glass, plastic, etc. The surface 120 of the flat element that contacts the lens 110 is coated by an opaque material 130 (FIG. 1B) on the entire surface except on a round aperture 135 (FIG. 1B) in the center of the flat surface, in axial alignment with the apex of the curved surface of the plano-convex lens. It should be noted that in alternative embodiments, the aperture 135 may be constructed in differing manners. For example, a mechanic aperture may be utilized. As such, the description of an aperture being constructed by leaving an area not coated on a surface should be taken as exemplary only.

Figure 1C:
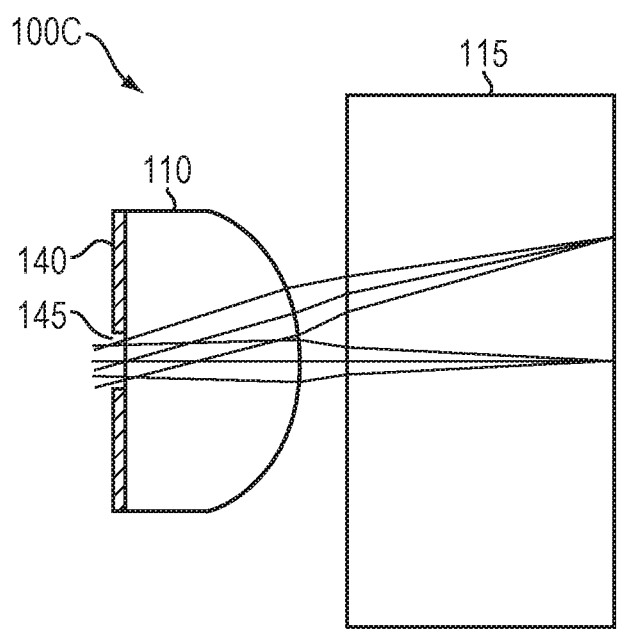
FIG. 1C is a view illustrating an exemplary lens assembly in accordance with an illustrative embodiment of the present invention.
Figure 1B:
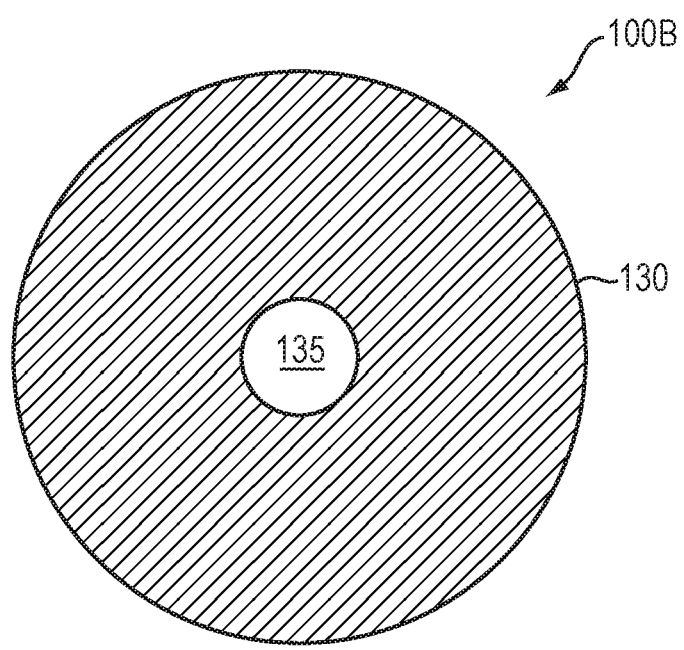
FIG. 1B is a view of an exemplary flat plate along the axis of the lens in accordance with an illustrative embodiment of the present invention.

FIG. 1C is a view of a lens 100C in accordance with an alternative embodiment of the present invention. In view 100C, the plano-convex lens 110 has its plano surface coated by an opaque material 140 other than a substantially circular aperture 145. In this alternative embodiment, the need for the flat element 105 is eliminated, thereby enabling the lens assembly 100C to be made smaller and more compact. This is advantageous for reducing costs as well as enabling smaller objective assemblies to be manufactured.

Either lens arrangement 100A, 100C may be used with CMOS image sensors 115. Illustratively, the CMOS image sensor 115 has an image size on the order of 1 mm or less, and with Chief Ray Angle acceptance specifications that are non-zero at the corners and edges of the active area. It should be noted that the teachings of the present invention may be utilized to form an optical assembly capable for forming an image while having a single curved optical surface. In alternative embodiments, the principles of the present invention may be utilized in an optical assembly that may be combined with one or more other optical assemblies to achieve desired functionality. These other optical assemblies may have one or more curved surfaces and may, or may not, be capable of forming an image.

It should be noted that while this description is written in terms of CMOS sensors, it is expressly contemplated that other types of digital image sensors may be utilized. Therefore, the description of the use of CMOS sensors should be taken as exemplary only.

These exemplary lens forms, while simple to describe, have not been practical for use with CMOS sensors because the single curved surface has not been sufficient to adequately control aberrations that degrade image quality. In particular, field curvature, which is caused by the curvatures of lenses in an optical system is not well corrected with a single plano-convex lens system.

For traditional sized CMOS sensors, this field curvature, particularly at the edge of the image, has been too large. As CMOS image sensors have been made smaller and smaller, the magnification (image size/object size) has been required to get smaller. For the lenses described herein, this smaller magnification requires the radius of the convex surface of the lens to get smaller, which causes the field curvature to be steeper, with a smaller radius, and would tend to make field curvature aberration worse. However, the smaller image size also allows for the edge of the image to be closer to the apex of the field curvature surface, which would tend to make the field curvature aberration better. The net effect on the field curvature aberration caused by these two effects is not obvious, but can be estimated by use of first order ray tracing theory.

For a lens system imaging an object at a distance B from the lens and with a height of $h_o$, onto an image sensor at a distance I from the lens, and with an image height, $h_i$, equal to ½ the sensor active area height, a focal length off is required. f can be determined by equation 1:

$$\frac{1}{I} + \frac{1}{B} = \frac{1}{f} \tag{1}$$

This is illustratively described in Smith, Warren J. (1990). Modern Optical Engineering, *The Design of Optical Systems*, Second Edition, MacGraw Hill, Inc., the contents of which are hereby incorporated by reference.

The ratio of image to object heights and distances are related as shown in equation 2:

$$\frac{h_i}{h_o} = \frac{I}{B} \tag{2}$$

Combining equations (1) and (2) and rearranging terms gives equation 3:

$$f = \frac{h_i B}{h_i + h_o} \tag{3}$$

Field of View (FOV), by definition, is given by equation (4):

$$h_o = B \tan(FOV2) \text{ where } FOV2 = FOV/2 \tag{4}$$

Combining equations (3) and (4) gives equation (5):

$$f = \frac{h_i B}{h_i + B\tan(FOV2)} \tag{5}$$

The lens makers equation relates focal length to the radius of curvature, R, of the convex surface of the plano-convex lens with index refraction, n, as shown in equation (6):

$$\frac{1}{f} = \frac{(n-1)}{R} \tag{6}$$

Combining equations (5) and (6) gives equation (7):

$$R = (n-1)\frac{Bh_i}{h_i + B\tan(FOV2)} \tag{7}$$

The radius, $R_p$, of the so-called Petzval field curvature spherical surface is related to the radius of the convex lens surface and index of refraction of the lens by the following equation (8):

$$\frac{1}{R_p} = \frac{1}{R}\left(1 - \frac{1}{n}\right) = \frac{1}{R}\left(\frac{n-1}{n}\right) \tag{8}$$

$$a. \ R_p = R\frac{n}{n-1}$$

This is illustratively described in Wolfe, William L. (2003). *Optical Engineer's Desk Reference*, Optical Society of America, the contents of which are hereby incorporated by reference.

Combining equations (7) and (8) gives equation (9):

$$R_p = \frac{nBh_i}{h_i + B\tan(FOV2)} \tag{9}$$

Finally, from geometrical considerations, the distance between the Petzval field curvature and the image sensor, or the image shift, $d_i$, is given by equation (10):

$$d_i = R_p - \sqrt{R_p^2 - h_i^2} \tag{10}$$

Figure 2:
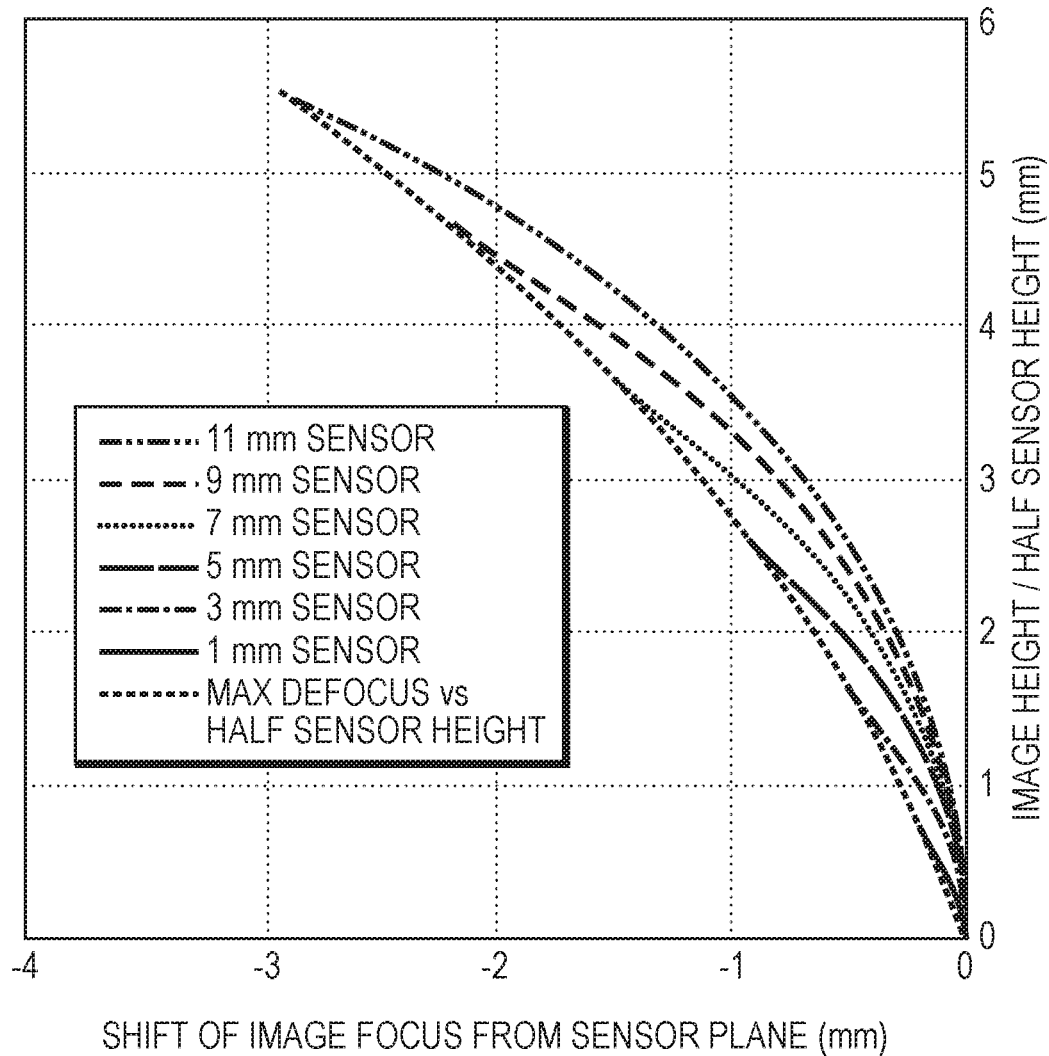
FIG. 2 is a chart detailing shifts in image focus in accordance with an illustrative embodiment of the present invention.

While the curve, relating $d_i$ and $h_i$, described by equations (9) and (10) will depend on the values of n, FOV, and B, the general shape of the relationship is shown by the dashed line in FIG. 2. The other lines in FIG. 2 show the individual field curvature lines for image points across the image sensor extending from 0 to $h_i$. This plot shows that although the radius of the field curvature surface is reduced when the image sensor size is reduced, the smaller maximum image size ultimately results in a smaller defocus distance at the edge of a smaller sensor as compared to the defocus distance at the edge of a larger sensor. Also, the plot in FIG. 2 shows that the reduction in defocus distance with smaller sensor size is non-linear, so that the defocus distance at the edge of the sensor drops faster than the reduction in sensor size.

Figure 3:
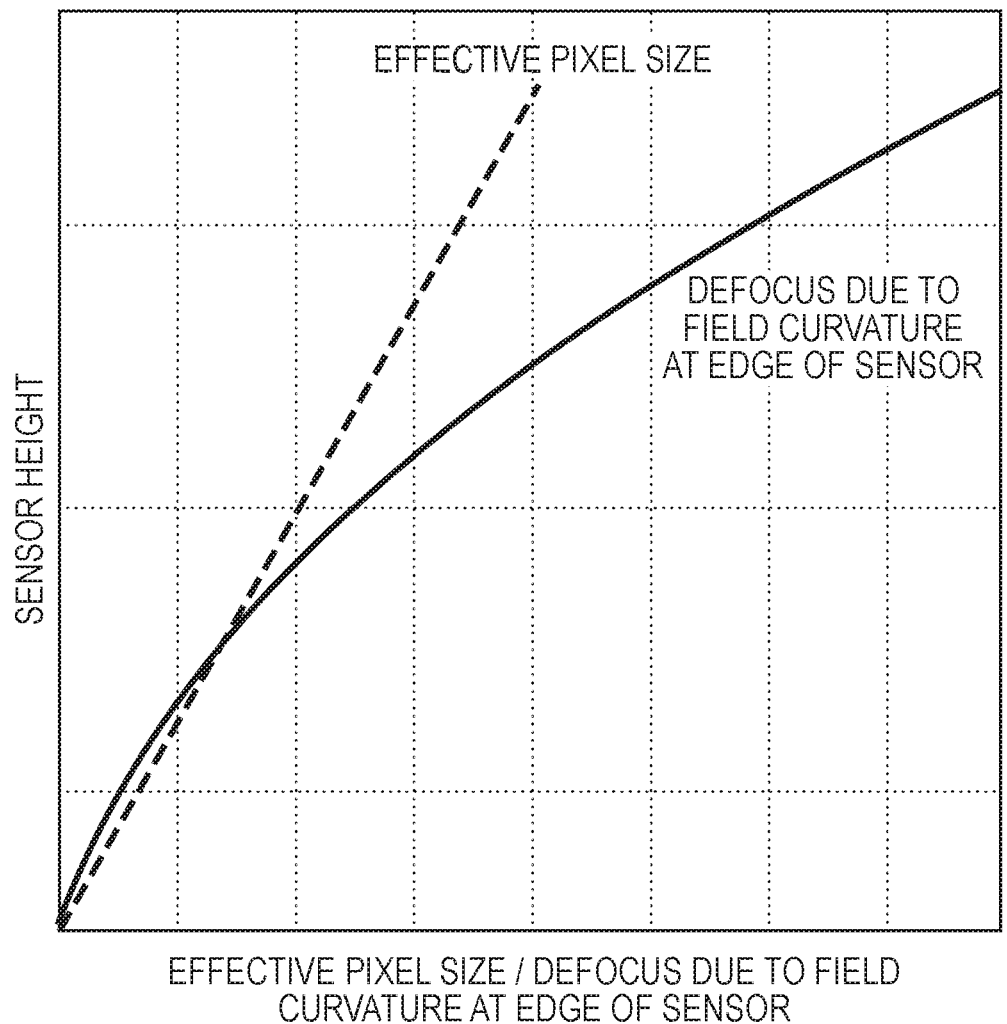
FIG. 3 is a chart illustrating effective pixel sizes and defocus due to field curvature in accordance with an illustrative embodiment of the present invention.

The defocus spot size on the image sensor is linearly related to the defocus distance between image sensor plane and the field curvature surface. If the number of pixels across the image sensor is held constant as the image sensor is reduced in size, then the pixel size will be linearly related to the image sensor size. While the exact relationship between these two curves will depend on the variables identified above, as well as F number and other potential aberrations such as distortion, chromatic aberration, etc., the general relationship is shown in FIG. 3.

This figure shows that at some critical sensor size and below, the blur spot size caused by field curvature will be smaller than the effective pixel size. Under this condition, and assuming the Chief Ray Angle specification of the sensor can accommodate that of the lens, the lens described in various embodiments of the present invention will have a blur spot that is comparable to or smaller than the effective pixel size and will generate an image with resolution limited by the size of the sensor pixels, not the imaging lens.

While the principles of the present invention may be utilized with larger image sensors, not all of the advantages may be achieved. In certain embodiments, the acceptable blur size may exceed the size of an effective pixel size; however, depending on the application, an image with such an acceptable blur size may be suitable for use. Further, in alternative embodiments, if the acceptable blur size is defined as a fixed percentage of the image size, or equivalently, if the desired number of resolution elements across the sensor is fixed, the analysis here demonstrates that for a small enough sensor, this invention may provide a suitable image with blur spot due to field curvature smaller than the acceptable blur size. In such alternative embodiments, the blur spot may cover more than one pixel. Again, depending on the particular application, such a blurred image may be useful or suitable for use. In practice, we find that for object distances of 3 to 50 mm, and fields of view from about 50 to 120 degrees, a sensor size of approximately 0.5 to 1.0 mm, with 200×200 pixels will result in a good quality image when using the lens described here.

Figure 4:
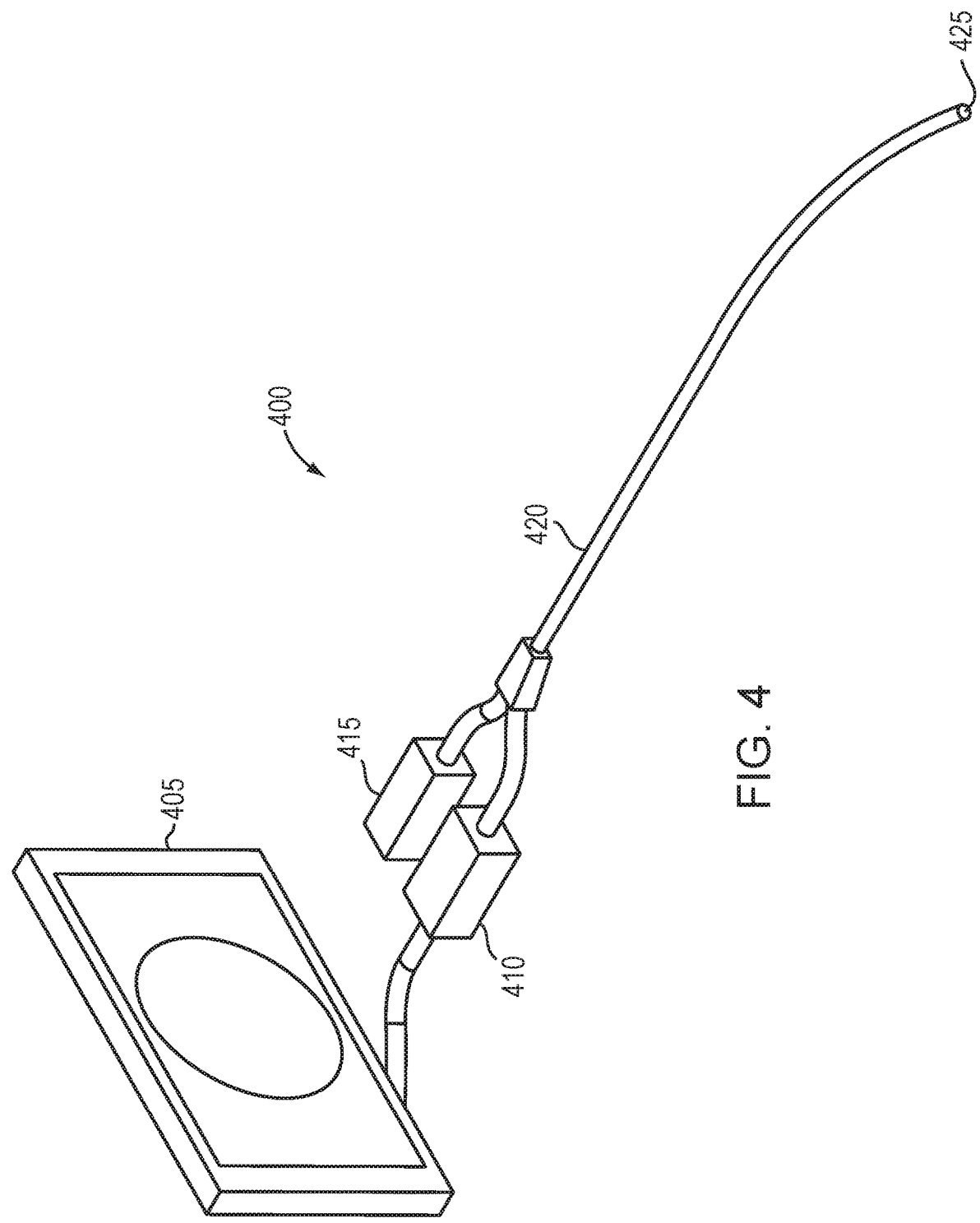
FIG. 4 is a general view of an endoscope in accordance with an illustrative embodiment of the present invention.
Figure 5:
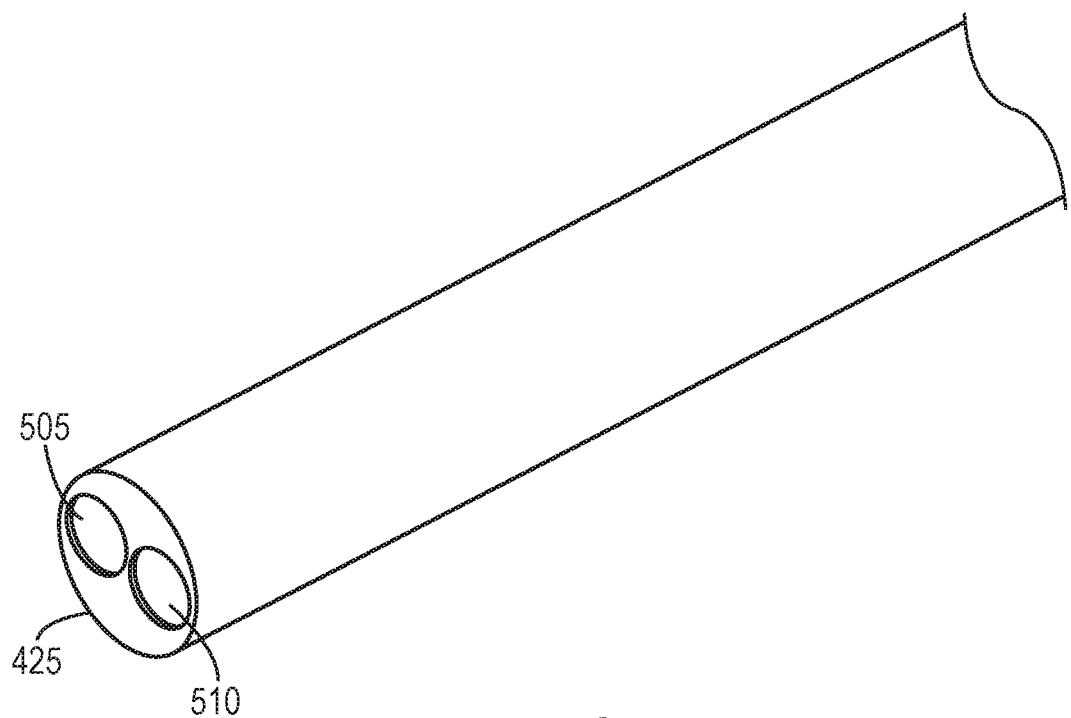
FIG. 5 is a view of a distal end of an endoscope in accordance with an illustrative embodiment of the present invention.

FIG. 4 is a general view of an exemplary endoscope system 400 in accordance with an illustrative embodiment of the present invention. A display 405 provides a view of the images received by endoscope. The display is powered by a vision processor 410 that illustratively receives images from the distal end 425 of the endoscope. An illumination source 415 provides illumination through the endoscope probe 420 to the distal end 425, typically through an optical fiber. The distal end 425 is shown in greater detail in FIG. 5. As seen in FIG. 5, the distal end 425 has two apertures 505 and 510. Illustratively, aperture 505 is an illumination source, such as an optical fiber to provide illumination to an area when the endoscope is in use. The aperture 510 illustratively is the objective for an image sensor, such as the objective lens described above in relation to FIGS. 1A-C.

It should be noted that the various descriptions and embodiments described herein are exemplary only. While this description has been written in terms of certain materials, it should be noted that, in alternative embodiments, differing materials may be utilized. As such, the description of any specific materials should be taken as exemplary only.

What is claimed is:

1. An apparatus comprising:
   an optical element having a first flat optical side and a second flat optical side;
   a plano-convex lens, the plano-convex lens being made of glass and having a substantially circular cross section;
   wherein the first flat optical side of the optical element is coated with an opaque material other than a substantially circular aperture located in line with an axis of the plano-convex lens, wherein the substantially circular aperture functions as an aperture stop for the plano-convex lens; and
   wherein a convex side of the plano-convex lens is an only curved optical surface in the apparatus.

2. The apparatus of claim 1 further comprising an image sensor arranged substantially perpendicular to the axis of the plano-convex lens.

3. The apparatus of claim 2 wherein a size of a blur spot created by field curvature is smaller than an effective pixel size of the image sensor.

4. The apparatus of claim 1 wherein the optical element is made of optical glass.

5. The apparatus of claim 2 wherein the image sensor is a CMOS image sensor.

6. An apparatus comprising:
   an optical element having a singular curved surface, wherein the singular curved surface is an only curved optical surface in the apparatus, wherein the optical element is made of glass and has a substantially circular cross section; and
   an aperture located in line with an axis of the single curved surface, wherein the aperture is formed by coating a flat optical side of the optical element with an opaque material other than the aperture.

7. The apparatus of claim 6 wherein the optical element is a plano-convex lens.

8. The apparatus of claim 6 wherein the aperture is located on a flat surface of the optical element.

9. The apparatus of claim 6 wherein the aperture is located on a flat surface of a second optical element that is in contact with the first optical element.

10. The apparatus of claim 9 wherein the flat surface is coated with an opaque material other than the aperture.

11. The apparatus of claim 6 wherein the aperture is substantially circular.

12. The apparatus of claim 6 further comprising an image sensor arranged substantially perpendicular to the axis of the single curved surface.

13. The apparatus of claim 12 wherein the image sensor is a CMOS sensor.

14. An apparatus comprising:
   a first optical assembly, the optical assembly capable of forming an image and having:
      an optical element having a first flat optical side and a second flat optical side;
      a plano-convex lens, the plano-convex lens being made of glass and having a substantially circular cross section; and
      wherein the first optical side of the optical element is coated with an opaque material other than a substantially circular aperture located in line with an axis of the plano-convex lens; and
   a second optical assembly.

15. The apparatus of claim 14 further comprising an image sensor arranged substantially perpendicular to the axis of the plano-convex lens.

16. The apparatus of claim 15 wherein a size of a blur spot created by field curvature is smaller than an effective pixel size of the image sensor.

\* \* \* \* \*

UNITED STATES PATENT AND TRADEMARK OFFICE
CERTIFICATE OF CORRECTION

PATENT NO. : 10,620,424 B1
APPLICATION NO. : 15/706116
DATED : April 14, 2020
INVENTOR(S) : Brian E. Volk et al.

Page 1 of 1

It is certified that error appears in the above-identified patent and that said Letters Patent is hereby corrected as shown below:

In the Specification

Column 2, Line 49:
"and 1s comprised of a flat element 105 in contact with the"
Should read:
--and is comprised of a flat element 105 in contact with the--

Column 3, Line 49:
"to ½ the sensor active area height, a focal length off is"
Should read:
--to ½ the sensor active area height, a focal length of f is--

Signed and Sealed this
First Day of July, 2025

Coke Morgan Stewart
*Acting Director of the United States Patent and Trademark Office*